United States Patent

[11] 3,565,367

[72] Inventor Kozo Yamamoto
Hirakata-shi, Japan
[21] Appl. No. 785,610
[22] Filed Dec. 20, 1968
[45] Patented Feb. 23, 1971
[73] Assignee Matsushita Electric Industrial Co., Ltd.
Osaka, Japan
[32] Priority Feb. 28, 1967, Dec. 28, 1967, Dec. 28, 1967, Feb. 20, 1968
[33] Japan
[31] 43/74, 43/133, 43/141 and 43/13592

[54] TAPE CARTRIDGES
2 Claims, 16 Drawing Figs.

[52] U.S. Cl. ........ 242/199, 317/2
[51] Int. Cl. ........ G11b 23/04
[50] Field of Search ........ 242/198, 199, 200, 197, 210, 55.19 (A); 317/2

[56] References Cited

UNITED STATES PATENTS

| | | | |
|---|---|---|---|
| 2,919,866 | 1/1960 | Minott, Jr. | 242/192 |
| 2,937,818 | 5/1960 | Zorn | 242/199 |
| 2,988,295 | 6/1961 | Loewe | 242/199 |
| 3,027,110 | 3/1962 | Andrews | 242/210 |
| 3,258,215 | 6/1966 | Ono | 242/197X |
| 3,350,025 | 10/1967 | Lear | 242/55.19 |
| 3,467,340 | 9/1969 | Rosenburgh | 242/197 |

FOREIGN PATENTS

| | | | |
|---|---|---|---|
| 851,826 | 10/1960 | Great Britain | 242/197 |

*Primary Examiner*—John Petrakes
*Attorney*—Stevens, Davis, Miller & Mosher

ABSTRACT: A tape cartridge wherein a portion of a cartridge casing is made transparent and sheets each having a printed surface on one side thereof are disposed in the casing on both sides of a tape accommodated in said casing with the printed surface thereof facing the transparent portion of the casing, whereby the tape is prevented from contacting the inner surface of the casing and therefore forwarded smoothly, and at the same time the label of the cartridge is indicated through the transparent portion of the cartridge casing.

INVENTOR
KOZO YAMAMOTO

BY Stevens, Davis, Miller & Mosher
ATTORNEYS

INVENTOR

KOZO YAMAMOTO

BY Stevens, Davis, Miller & Mosher

ATTORNEYS

PATENTED FEB 23 1971

3,565,367

INVENTOR
KOZO YAMAMOTO

BY Stevens, Davis, Miller & Mosher

ATTORNEYS

INVENTOR
KOZO YAMAMOTO

BY Stevens, Davis, Miller & Mosher

ATTORNEYS

INVENTOR
KOZO YAMAMOTO

BY Stevens, Davis, Miller & Mosher

ATTORNEYS

PATENTED FEB 23 1971

3,565,367

INVENTOR
KOZO YAMAMOTO

BY

ATTORNEYS

INVENTOR
KOZO YAMAMOTO

BY Stevens, Davis, Miller & Mosher

ATTORNEYS

TAPE CARTRIDGES

The present invention relates to a tape cartridge, and more particularly to such a tape cartridge in which improvements are made by using of sheets disposed in a cartridge casing which is partially made transparent.

A prior art tape cartridge, as shown in FIGS. 1 to 3 inclusive, comprises a hollow casing composed of an upper case member and a lower case member which are made of an opaque material; doughnut-shaped tape winding elements 4, 5, e.g. hubs, rotatably mounted in the hollow of the casing and having the opposite ends of a tape 3 connected thereto respectively; transparent window plates 8 each consisting of a planar sheet of transparent resin and fitted to a window, formed in a predetermined position of both the upper case member 1 and the lower case member 2, by means of an adhesive or any other suitable means; and flat, thin sheets consisting of a sheet of resin, such as polyester, vinyl chloride, polypropylene or polyamide, or an aluminum or tin foil, or a carbon-containing plastic film, and interposed between one end face of the tape winding and the upper case member and between the opposite end face of the tape winding and the lower case member respectively. As may be understood from the foregoing, the sheets 6, 7 are made of a material having a small coefficient of friction so as to reduce the frictional torque exerted on the tape winding elements 4, 5 and the end faces of the tape and thereby to effect smooth movement of the tape. Use of such sheets is advantageous in preventing the end faces of the tape winding from contacting directly with the inner surfaces of the upper case member 1 and the lower case member 2, reducing the squeaky sound and avoiding or minimizing the electrostatic charging. The upper case member 1 and the lower case member 2 carry on the top surfaces thereof labels 9 and 10 respectively which are attached thereto by means of a pressure-sensitive adhesive. After the tape winding elements 4, 5, having the tape 3 connected thereto, and the two sheets 6, 7 have been mounted in the casing, with said tape winding elements disposed between said sheets, the upper case member 1 and the lower case member 2 are fixedly connected with each other by means of tightening screws 11.

As described above, the conventional tape cartridge has labels 9, 10 attached to the outer surfaces of the upper case member 1 and the lower case member 2. This necessitates the provision of the labels separately from the sheets 6, 7 and provides an additional cause of rejection of the tape cartridge when the labels are not attached properly at the prescribed locations. Furthermore, the labels tend to be soiled by handling and detached from the casing or to curl upon deterioration of the adhesive. In addition, in the conventional tape cartridge, it is necessary to provide the transparent window plate 8 of a transparent resin material in a predetermined position of both the upper case member 1 and the lower case member 2 for inspection of the condition of the tape winding 3 therethrough.

Furthermore, in the conventional tape cartridge, the sheets 6, 7 interposed between the tape winding 3 and the inner surfaces of the upper case member 1 and the lower case member 2 are flat in shape. Therefore, a gap is produced between the inner surfaces of the respective case members, and tape winding 3 and the hubs 4, 5, allowing said hubs to move vertically between said case members during running of the tape. As a result, the tape cannot be wound neatly and the end faces of the resultant tape winding become ragged, so that the thickness of the tape winding becomes large and thus the tape edges are damaged.

Still further, since the sheets are rectangular in shape, the sheets occasionally bend in a direction to compress the tape winding therebetween. In this case, the tape winding on the hub 4 or 5 which is becoming larger in diameter is compressed by the inwardly curved sheets 6, 7 and the tape is subjected to a large torque which acts against the tape unwinding or winding force. Such torque becomes larger as the diameter of the tape winding becomes larger.

Yet further, the degree of the inward curve of the sheets 6, 7 is largest at the tape payoff point, that is, the point where the tape is released from the tape winding. Therefore, the tape leaving the tape winding is subjected to a strong pressure and forwarded at an angle with the inner surfaces of the casing 1, 2. This brakes the tape or causes damage to the tape edges. In view of the foregoing, the use of such flat sheets in the tape cartridge is undesirable.

In the past, no tape cartridges have ever been made available which have a region, e.g. a frosted region, provided on the outer surface of the casing thereof for marking letter or symbols, indicating the content of the recorded tape contained in said cartridge, thereon by a writing instrument. As an alternative, some of the tape reels have only that portion of the surfaces thereof frosted to be a frosted glass surface or a file surface on which letters or symbols are to be put by writing. However, the letters or symbols put on such a frosted portion of the reel can hardly be identified when the opposite side is dark colored, because of a substantial lack of light reflection. This is true particularly when the letters or symbols are written in pencil.

It is, therefore, an object of the present invention to provide an advantageous tape cartridge which is free from the above-described drawbacks of the conventional one and in which further improvements are made.

It is another object of the invention to provide a tape cartridge in which a casing thereof is made of a transparent material and sheets are disposed in the transparent casing, whereby the labels which were attached on the upper and lower surfaces of a conventional tape cartridge are eliminated by making use of said sheets and the cost of the tape cartridge is reduced.

It is still another object of the invention to provide a tape cartridge which enables to avoid a disorderly winding of a tape in a casing thereof.

It is still another object of the invention to provide a tape cartridge wherein a tape accommodating casing thereof is entirely or partially made of a transparent material so that the interior of the casing may be visible from the outside and a portion of the outer surface of said casing is frosted providing for writing with a writing instrument, such as a pencil or the like, letters or symbols thereon indicating the content of a recorded tape contained in the casing, and further means is provided to make the letters or the symbols vividly visible.

It is still another object of the invention to provide a tape cartridge wherein a casing thereof is made of a transparent material and a provision is made on the outer surface of said casing for writing letters or symbols on said surface indicating the content of a recorded tape in said casing, and further sheets are disposed in the casing so that said letters or symbols may become vividly visible.

The tape cartridge according to the present invention comprises a hollow casing composed of an upper case member and a lower case member each having a transparent portion therein, a tape winding element or elements disposed in the hollow of said casing with a tape wound thereon and sheets having a printed surface on one side thereof and interposed between one end face of the tape winding and the upper case member and between the opposite end face of the tape winding and the lower case member respectively with the printed surfaces of said sheets respectively facing the inner surfaces of the transparent portions of said upper case member and said lower case member. Therefore, according to the invention, unlike, in the conventional tape cartridge, there is no need of attaching labels on the surface of the casing and accordingly the cost of the labels and the cost of the label attaching operation can be eliminated. Further, since the upper and lower case members have a transparent portion, there is no need of providing transparent windows separately and therefore it is possible to reduce the number of component parts, the number of man hours and the cost of the finished tape cartridge. The tape cartridge of the invention also brings about such practical advantage that since no labels are used, the rejection of the finished tape cartridge due to improper labelling and soiling of the labels can be eliminated which have been encountered in the production and use of the conventional tape cartridge.

According to the present invention, there is also provided a tape cartridge comprising a casing, a tape winding element or elements provided in said casing with a tape wound thereon and sheets interposed between said tape and said tape winding element or elements, and the opposed inner surfaces of said casing, and each being curved in such a way that the opposite edges thereof contact the inner surface of the casing respectively, while that portion thereof which is in contact with the tape is held away from said inner surface of the casing thereby yieldingly pressing one end face of the tape winding and the tape winding element or elements. In the tape cartridge of the construction described above, the tape winding element or elements are not allowed to move vertically but are always held in a fixed position or positions, so that the disadvantages encountered in the use of flat sheets, as mentioned previously, can be obviated.

According to the present invention, there is also provided a tape cartridge having frosted portions on the outer surface of a casing thereof to provide for writing thereon letters or symbols indicating the content of a recorded tape contained in said casing or any other information, and also having frosted portions on the inner surface of the casing at locations opposite to said first frosted portions, so as to provide a white background for the letter or symbols by the effect of irregular reflection of light on said frosted surfaces. Therefore, the letters or symbols put on the frosted portions on the outer surface of the casing appear more vividly than in the case wherein the frosted portions are provided only on the outer surface of the casing. The frosted portions may be formed by roughening the corresponding portions of a metal mold in which the casing is molded. Thus, it is not necessary to attach labels on the cartridge.

According to the present invention, there is further provided a tape cartridge comprising a hollow casing composed of an upper case member and a lower case member each having a transparent portion and an aventurine portion therein, a tape winding element or elements provided in the hollow of said casing with a tape wound thereon and sheets having a portion thereof colored in white color or a color equivalent to white color and interposed between one end face of the tape winding and the upper case member and the lower case member respectively, said colored portions of the respective sheets being superposed by the aventurine portions respectively of the upper case member and the lower case member.

The tape cartridge of the type described above is advantageous in that since the portion of the casing on which letters or symbols are written to indicate the content of the recorded tape in the casing or other information is formed by molding, it enables the letters or symbols to be written or erased thereon frequently; in that since each of the sheets disposed in the casing has a portion thereof colored in white color or a color equivalent to white color to provide a white background for the letters or the symbols, the letters or the symbols appear vividly; and further in that the tape cartridge is simple in structure and can be produced at low costs.

Other objects, features and advantages of this invention will be better understood from the following detailed description when taken in conjunction with the accompanying drawings in which.

In the drawings, similar parts are indicated by the same numerals.

An embodiment of the tape cartridge according to the present invention will be described hereunder with reference to FIGS. 4 and 5. Descriptions on those constitutional elements of the cartridge which are the same as those in the prior art tape cartridge described previously will be omitted.

Figure 1:
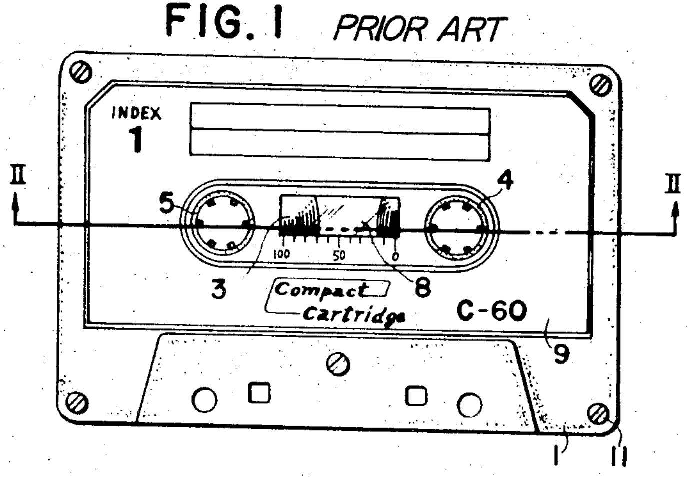
FIG. 1 PRIOR ART
FIG. 1 is a top plan view of a prior art tape cartridge.
Figure 2:
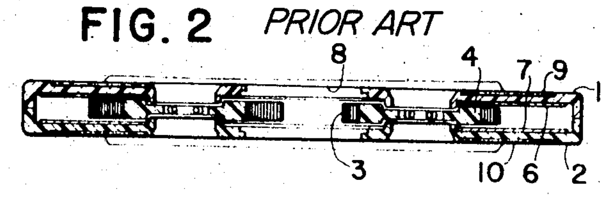
FIG. 2 PRIOR ART
FIG. 2 is a sectional view taken on the line II–II of FIG. 1.
Figure 3:
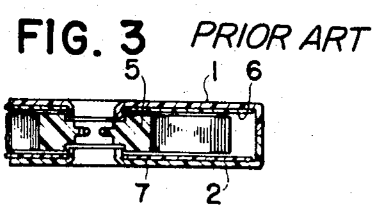
FIG. 3 PRIOR ART
FIG. 3 is a fragmentary sectional view showing the principal portion of the tape cartridge shown in FIG. 1.
Figure 4:
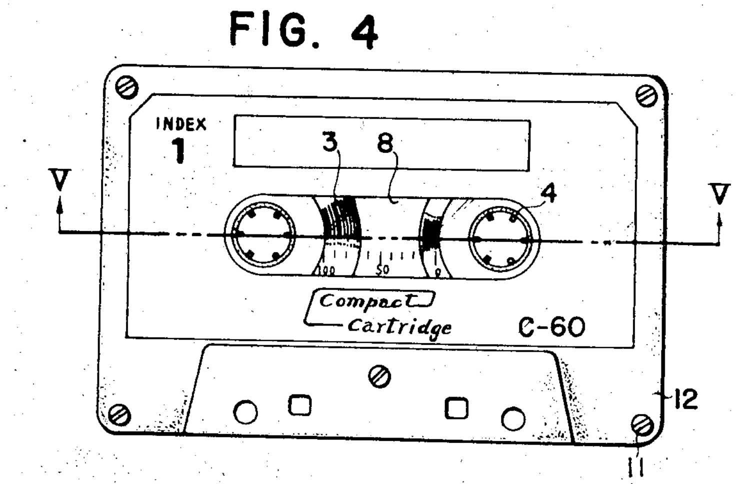
FIG. 4 is a top plan view of an embodiment of the tape cartridge according to the present invention.
Figure 5:
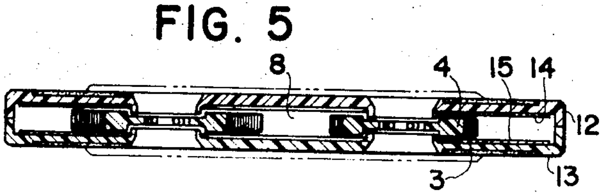
FIG. 5 is a sectional view taken on the line V–V of FIG. 4.

Referring to FIGS. 4 and 5, reference numerals 12 and 13 designate upper and lower case members respectively which have transparent portions or are transparent as a whole. Reference numerals 14 and 15 designate sheets made of the same material as the sheets 6 and 7 described previously, and each having a printed surface, corresponding to a label, at a portion which will appear through the main surface of the upper case member 12 or the lower case member 13 when the cartridge is assembled.

When the sheets 14, 15 and the upper case member 12 and the lower case member 13 are assembled, the printed markings on said respective sheets are visible through the transparent portions of said respective case members, and there is no need of attaching labels.

The sheets are made of an electrically nonconductive material, such as polyester, vinyl chloride or polyethylene, and therefore charged with frictional electricity. However, by incorporating an electrically conductive material in a printing ink for the markings printed on the surfaces of the sheets, partial charging of the sheets can be prevented and the rotation of the tape will not be interfered with. It is also to be noted that the appearance of the cartridge is improved by the refraction and reflection of light when the main surfaces of the upper and lower case members having a transparent portion are finished ruggedly or prismatically.

Another embodiment of the tape cartridge according to this invention will be described with reference to FIGS. 6 and 7. In this embodiment, the case members 12, 13 are each made of a transparent material and the sheets 14, 15 have the longitudinal edge portions curved in the same direction with respect to the longitudinal centerline thereof, so that when the cartridge is assembled with the sheets 14, 15 located between the case member 12 and the tape 3 and between the case member 13 and the tape 3 respectively, said sheets contact the inner surfaces of the respective case members 12, 13 at their longitudinal edge portions, while the longitudinal central portions thereof are held away from said inner surfaces respectively, yieldingly clamping the tape winding 3 and the hubs 4, 5 therebetween. The sheets 14, 15 may have letters or other symbols printed on the surfaces which face the respective case members 12, 13, for the identification of the tape cartridge.

The tape cartridge of the construction described above is advantageous in that the tape winding 3 and the hubs 4, 5 can be retained at prescribed positions under the biasing forces of the sheets 14, 15, so that the hubs 4, 5 are not allowed to move vertically even during running of the tape and the tape is always wound neatly with the edges thereof arranged in the same planes.

The tape cartridge is also advantageous in that, since the edge portions of the sheets 14, 15 are curved toward the respective case members 12, 13, the tape 3 will not be inclined relative to the surfaces of said case members even when it is released from a tape winding of large diameter, and accordingly there is no danger that the tape will be subjected to a large frictional force or the edges of the tape will become damaged, ensuring a stable and satisfactory recording or reproduction.

It is also to be noted that, since the case members 12, 13 are made of a transparent material and the letters or the symbols to identify the cartridge are printed on those surfaces of the sheets 14, 15 which face said case members 12, 13 respectively, the cost of the cartridge can be reduced markedly and there is no danger that of the letters or symbols will be removed from the cartridge, as compared with a conventional cartridge which has a cartridge identification label attached thereon.

Figure 7:
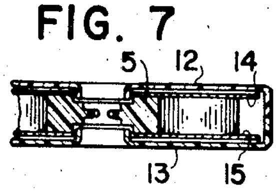
FIG. 7 is a fragmentary sectional view showing the principal portion of the tape cartridge shown in FIG. 6.
Figure 9:
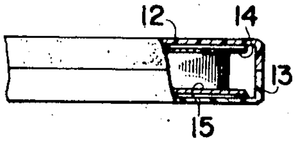
FIG. 9 is a fragmentary side view of the tape cartridge shown in FIG. 8, with the principal portion thereof shown in section.
Figure 6:
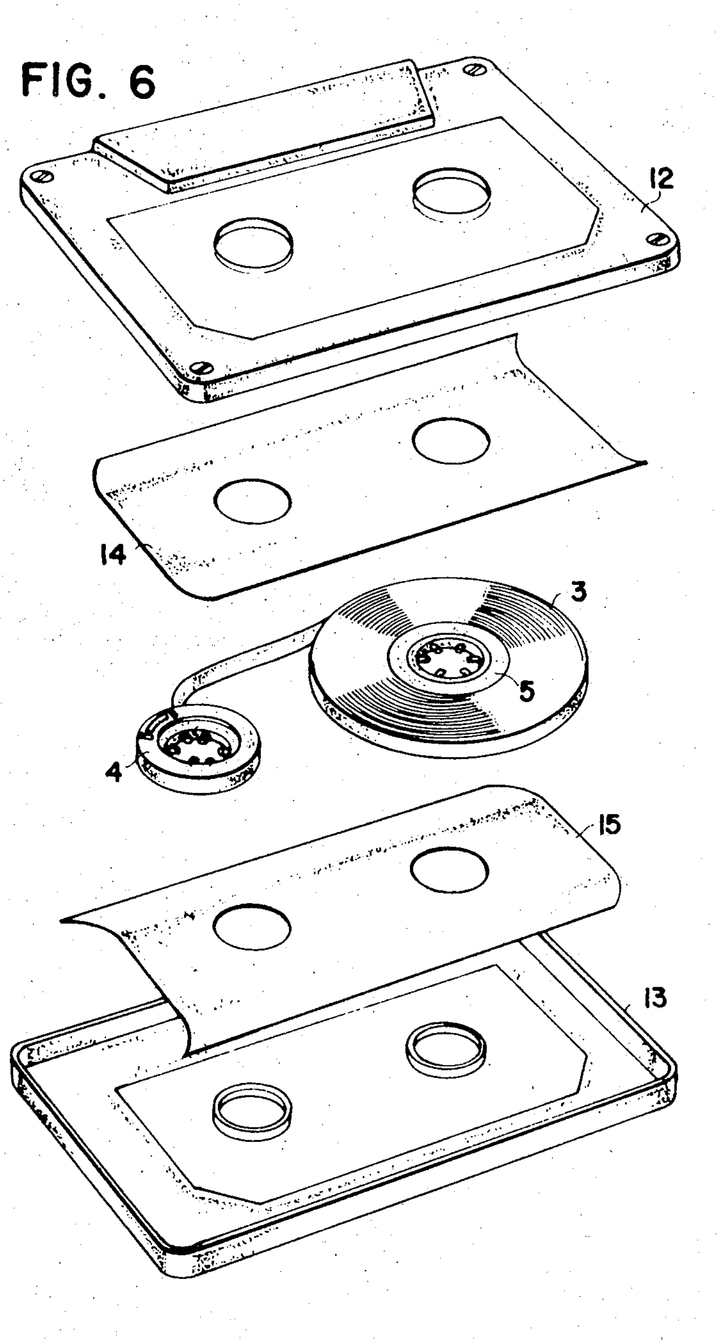
FIG. 6 is an exploded perspective view of another embodiment of the tape cartridge of this invention.
Figure 8:
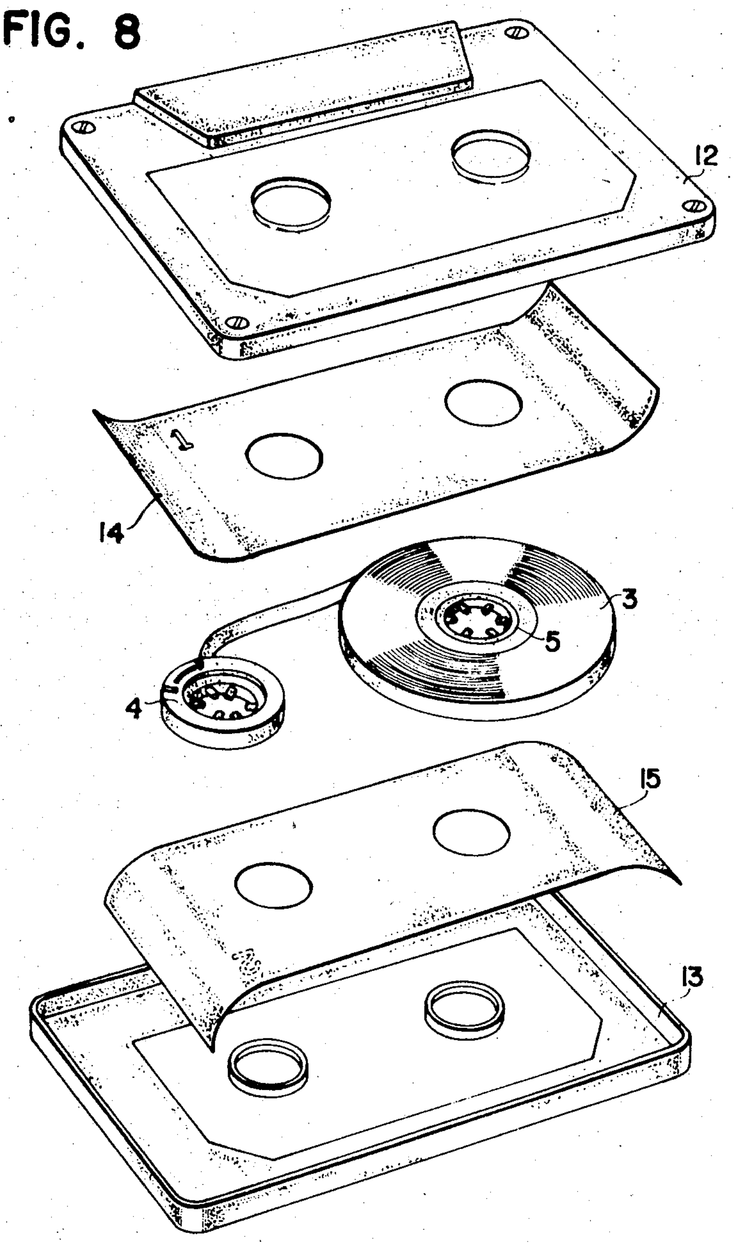
FIG. 8 is an exploded perspective view of still another embodiment of the tape cartridge of this invention.

FIGS. 8 and 9 show a modification of the tape cartridge shown in FIGS. 6 and 7. In this modification, the sheets 14, 15 are both curved at the transverse edge portions thereof in the same direction with respect to the centerline perpendicular to the longitudinal center line, or the transverse centerline. Therefore, when the cartridge is assembled with the sheets 14, 15 located between the case member 12 and the tape 3 and the hubs 4, 5, and between the case member 13 and said tape 3 and said hubs 4, 5 respectively, the transverse edge portions of the sheets 14, 15 are held in contact with the inner surfaces of the respective case members 12, 13, while the central portions thereof are held away from said respective inner surfaces, clamping the tape winding and the hubs 4, 5 therebetween, as in the case of the preceding embodiment. This tape cartridge has the same advantages as those possessed by the cartridge of the preceding embodiment.

Still another embodiment of the present invention will be described with reference to FIGS. 10 and 11, wherein the tape cartridge is partially frosted. In this embodiment, the upper case member 12 and the lower case member 13 are made of a transparent material, such as a styrol-type synthetic resin and have a portion of the surfaces thereof frosted as at 16, 17 by forming a fine ruggedness for writing letters or symbols indicating the content of the recorded tape accommodated in the tape cartridge. The portions of the backsides of the case members opposite to the respective frosted portions 16, 17 are similarly frosted as at 18, 19 for writing letters or symbols thereon in pencil.

Figure 10:
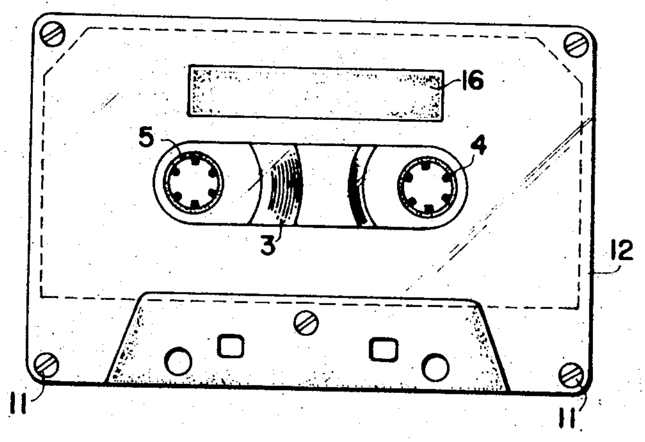
FIG. 10 is a top plan view of still another embodiment of the tape cartridge of this invention.
Figure 11:
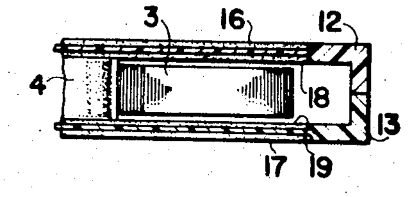
FIG. 11 is a fragmentary sectional view showing the principal portion of the tape cartridge shown in FIG. 10.
Figure 12:
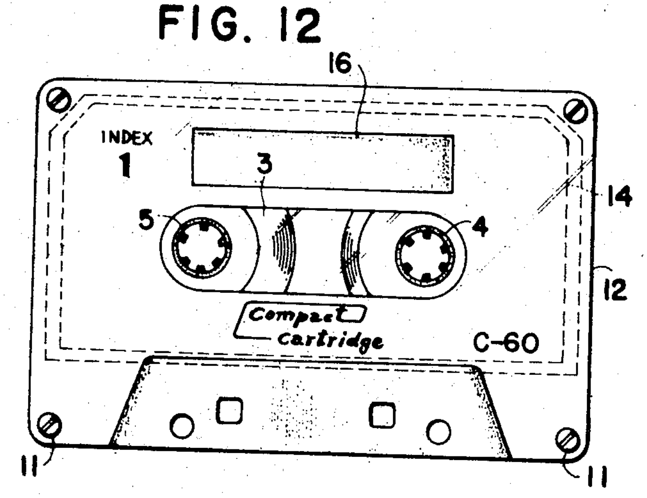
FIG. 12 is a top plan view of still another embodiment of the tape cartridge of this invention.
Figure 13:
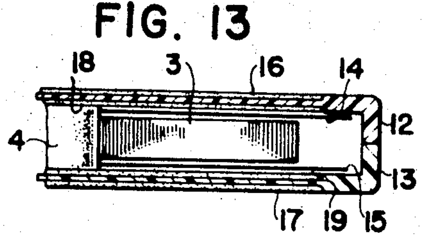
FIG. 13 is a fragmentary sectional view showing the principal portion of the tape cartridge shown in FIG. 12.

A modification of the tape cartridge shown in FIGS. 10 and 11 is shown in FIGS. 12 and 13. This cartridge differs from that shown in FIGS. 10 and 11 in that sheets 14, 15 made of a material having small coefficient of friction, e.g. a sheet of such resin as polyester, vinyl chloride or polypropylene, or a foil of aluminum or tin, or a carbon-containing plastic film, and having a slippery surface are disposed in the cartridge casing 12, 13 to provide for smooth rotation of the hubs 4, 5. Each of the sheets 14, 15 has letters or symbols, indicating the type and the trade mark of the cartridge, printed at that portions thereof which are visible through the main surface of the case member 12 or 13. Furthermore, the sheets 14, 15 have a pattern or a color printed on the entire surfaces thereof to improve the appearance of the cartridge.

The tape cartridge of this embodiment has the following advantage: namely, when letters are written on the frosted portion 16 of the case member 12, the same effect as obtainable by placing a white paper or the like on the backside thereof can be obtained by reason of the irregular reflection of light on the frosted portion 18 on the backside of the case members, and thus the letters appear more vividly than in the case when the frosted portion is provided on the upper surface only of the case member. This effect will be more apparent when the surface of the sheet 14 is printed in a dark color, such as black, indigo blue or brown.

Namely, the letters written on the frosted portion 16 appear vividly even when the sheet having the surface thereof printed in a dark color is disposed in the cartridge casing as shown in FIGS. 12, 13. This is because the dark color of the sheet, in cooperation with the irregularly reflecting light layer, forms a white background at the frosted portion on the inner surface of the case member 12, which enables the letters to be clearly identified by a viewer by eliminating interference of the irregularly reflecting light with said letters.

Figure 15:
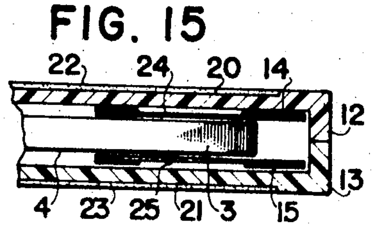
FIG. 15 is a fragmentary sectional view showing the principal portion of the tape cartridge shown in FIG. 14.
Figure 14:
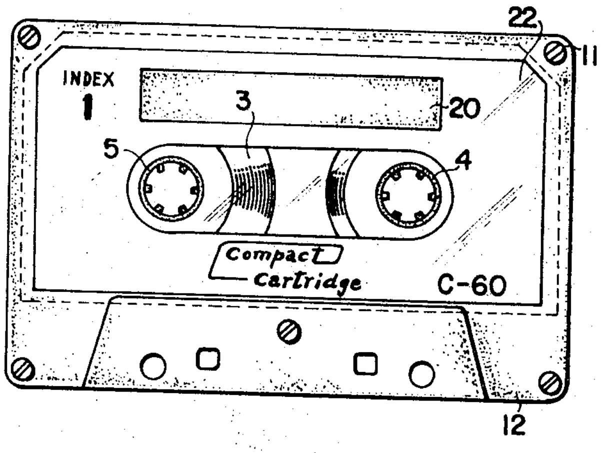
FIG. 14 is a top plan view of still another embodiment of the tape cartridge of this invention.
Figure 16:
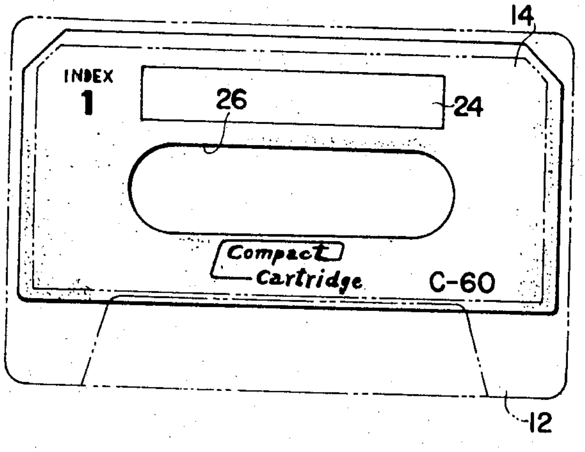
FIG. 16 is a top plan view of a sheet material composing the tape cartridge shown in FIG. 15.

Still another embodiment of the invention which attains the same object as that of the preceding embodiment will be described with reference to FIGS. 14 to 16 inclusive. According to this embodiment, each of the upper case member 12 and the lower case member 13 has an aventurine portion 20 or 21 and a transparent portion 22 or 23, while each of the sheets 14, 15, disposed in the cartridge casing between one side surface of the tape winding 3 and the case member 12 or 13 as in the preceding embodiment, has printings, equivalent to labels, provided on that area of the surface thereof which is visible through the transparent portion 22 or 23 of the upper case member 12 or the lower case member 13, and a portion 24 or 25 of white color or a similar color provided at a location corresponding to the aventurine portion 20 or 21 of the upper case member 12 or the lower case member 13. In the FIGS., reference numeral 26 designates a slot formed in each of the sheets 14, 15.

In this embodiment, letters or other symbols placed on the aventurine portion 20 or 21 of the upper case member 12 or the lower case member 13, indicating the content of the recorded tape contained in the cartridge, appear vividly on a background of white color or a similar color provided by the portion 24 or 25 of the sheet 14 or 15.

Although the present invention has been described and illustrated hereinabove with reference to tape cartridges adapted for containing two winding elements therein as embodiments thereof, it should be understood that these embodiments are only illustrative and the invention is similarly applicable, e.g. to a tape cartridge adapted for containing only one winding element therein, that is, the so-called endless-type cartridge.

I claim:

1. A tape cartridge comprising a hollow casing of transparent material, said casing comprising an upper case member and a lower case member, at least one tape winding element provided in the hollow defined by said casing, and sheets of flexible material having a low coefficient of sliding friction relative to a tape loosely disposed on each interior surface of said members, each of said sheets having a printed surface on one side thereof, said printed surface being printed with an electrically conductive ink and facing towards one of the interior surfaces of said members, and said sheets being in contact with said interior surfaces at the opposite edges thereof.

2. The cartridge according to claim 1, wherein opposite portions of said case member have partially frosted surfaces whereby writing can be effected on each said frosted surface exteriorly of said members.

UNITED STATES PATENT OFFICE

CERTIFICATE OF CORRECTION

Patent No. 3,565,367 Dated February 23, 197

Inventor(s) Kozo YAMAMOTO

It is certified that error appears in the above-identified paten and that said Letters Patent are hereby corrected as shown below:

The first priority date should read Dec. 28, 1967.

Signed and sealed this 9th day of November 1971.

(SEAL)
Attest:

EDWARD M.FLETCHER,JR.
Attesting Officer

ROBERT GOTTSCHALK
Acting Commissioner of